US011443755B1

(12) United States Patent
Bricklin et al.

(10) Patent No.: US 11,443,755 B1
(45) Date of Patent: *Sep. 13, 2022

(54) AUTOMATED VOICE ASSISTANT PERSONALITY SELECTOR

(71) Applicant: Wells Fargo Bank, N.A., San Francisco, CA (US)

(72) Inventors: Nathan Craig Bricklin, Walnut Creek, CA (US); Gregory John Hansen, El Dorado Hills, CA (US); Chris Theodore Kalaboukis, San Jose, CA (US); Adnan Khan, San Francisco, CA (US); Kathleen E. McGinn, Mill Valley, CA (US); Ryan Benjamin Miller, Petaluma, CA (US); Wairnola Marria Rhodriquez, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 16/864,631

(22) Filed: May 1, 2020

Related U.S. Application Data

(63) Continuation of application No. 15/870,030, filed on Jan. 12, 2018, now Pat. No. 10,643,632.

(51) Int. Cl.
*G10L 15/22* (2006.01)
*G10L 21/003* (2013.01)
(Continued)

(52) U.S. Cl.
CPC ............ *G10L 21/003* (2013.01); *G06F 3/167* (2013.01); *G10L 13/033* (2013.01); *G10L 15/22* (2013.01);
(Continued)

(58) Field of Classification Search
CPC ......... G10L 15/22; G10L 15/26; G10L 17/22; G10L 17/26; G10L 2015/228;
(Continued)

(56) References Cited

U.S. PATENT DOCUMENTS

| 7,920,682 B2 | 4/2011 | Byrne et al. |
| 8,170,196 B2 * | 5/2012 | Knott ................. G06Q 10/0639 706/62 |

(Continued)

FOREIGN PATENT DOCUMENTS

| WO | WO-03073417 A2 | 9/2003 |
| WO | WO-2016176375 A1 | 11/2016 |

OTHER PUBLICATIONS

U.S. Appl. No. 15/870,030 U.S. Pat. No. 10,643,632, filed Jan. 12, 2018, Automated Voice Assistant Personality Selector.
(Continued)

*Primary Examiner* — Vijay B Chawan
(74) *Attorney, Agent, or Firm* — Schwegman Lundberg & Woessner, P.A.

(57) ABSTRACT

Systems and techniques for automated voice assistant personality selector are described herein. A task may be identified that is to be completed by a user of a voice-enabled virtual assistant. A response may be output in connection with the task using a default personality for the voice-enabled virtual assistant selected based on the task. A task completion checkpoint may be determined for the task. It may be identified that the task completion checkpoint has not been reached. A personality profile of the user may be compared to personality data of a set of voice-enabled virtual assistant profiles corresponding to respective members of a set of available voice personalities for the voice-enabled virtual assistant. An escalation personality may be selected for the voice-enabled virtual assistant based the comparison and the task. Commands for facilitating user (Continued)

completion of the task may be transmitted via the voice-enabled virtual assistant using the selected escalation personality.

20 Claims, 4 Drawing Sheets

(51) Int. Cl.
| | |
|---|---|
| *G06F 3/16* | (2006.01) |
| *G10L 13/033* | (2013.01) |
| *G10L 17/22* | (2013.01) |
| *G10L 15/26* | (2006.01) |
| *G10L 25/63* | (2013.01) |

(52) U.S. Cl.
CPC .............. *G10L 15/26* (2013.01); *G10L 17/22* (2013.01); *G10L 25/63* (2013.01)

(58) Field of Classification Search
CPC ....... G10L 25/51; G10L 25/63; G10L 13/027; G10L 13/033; G10L 13/043; G10L 15/19; G10L 15/265; G10L 15/30; G10L 2015/088; G10L 25/66; G10L 15/08; G10L 15/1815; G10L 15/1822; G10L 15/183; G10L 15/20; G10L 2015/223; G10L 2015/227; G06F 3/167; G06F 40/27; G06F 40/278; G06F 40/279; G06F 40/286; G06F 40/289; G06N 20/00; G06N 3/006; G06N 5/02; G06N 5/04
USPC .......... 704/250, 261, 275, 277, 2; 379/88.01, 379/88.09, 88.16; 705/12, 26.1, 4, 7.13, 705/7.32
See application file for complete search history.

(56) References Cited

U.S. PATENT DOCUMENTS

| | | | | |
|---|---|---|---|---|
| 9,008,283 B2* | 4/2015 | Riahi | ............. | H04M 3/5175 379/88.01 |
| 9,390,706 B2 | 7/2016 | Gustafson et al. | | |
| 9,489,625 B2* | 11/2016 | Kains | ............. | G06N 5/02 |
| 9,648,167 B2* | 5/2017 | Riahi | ............. | H04M 3/5235 |
| 9,762,733 B1* | 9/2017 | Ramanujaiaha | .... | H04M 3/5183 |
| 9,824,188 B2* | 11/2017 | Brown | ............. | G10L 15/08 |
| 9,837,081 B2* | 12/2017 | Kannan | ............. | G10L 15/22 |
| 9,847,084 B2* | 12/2017 | Gustafson | ............. | G10L 15/26 |
| 9,959,129 B2* | 5/2018 | Kannan | ............. | G06F 3/0484 |
| 10,171,659 B2* | 1/2019 | Riahi | ............. | H04M 3/5183 |
| 10,331,791 B2* | 6/2019 | Anbazhagan | ............. | G06F 8/30 |
| 10,354,642 B2* | 7/2019 | Gurunath Kulkarni | | G10L 25/51 |
| 10,356,243 B2* | 7/2019 | Sanghavi | ............. | H04L 51/046 |
| 10,643,632 B2 | 5/2020 | Bricklin et al. | | |
| 2002/0029203 A1 | 3/2002 | Pelland et al. | | |
| 2003/0163311 A1 | 8/2003 | Gong | | |
| 2003/0167167 A1 | 9/2003 | Gong | | |
| 2003/0187660 A1 | 10/2003 | Gong | | |
| 2008/0096533 A1* | 4/2008 | Manfredi | ............. | G06N 3/006 455/412.1 |
| 2010/0318425 A1 | 12/2010 | Karanjia et al. | | |
| 2014/0282007 A1* | 9/2014 | Fleizach | ............. | G06F 9/453 715/728 |
| 2014/0365068 A1* | 12/2014 | Burns | ............. | G10L 13/033 701/31.5 |
| 2015/0186154 A1 | 7/2015 | Brown et al. | | |
| 2016/0189717 A1* | 6/2016 | Kannan | ............. | G10L 15/26 704/275 |
| 2016/0196336 A1 | 7/2016 | Allen et al. | | |
| 2016/0244011 A1 | 8/2016 | Ricci | | |
| 2016/0342317 A1 | 11/2016 | Lim et al. | | |
| 2017/0293610 A1* | 10/2017 | Tran | ............. | G06Q 10/109 |
| 2018/0005634 A1* | 1/2018 | Kannan | ............. | G10L 15/22 |
| 2018/0108353 A1* | 4/2018 | Gustafson | ............. | G06F 40/20 |
| 2019/0221225 A1 | 7/2019 | Bricklin et al. | | |

OTHER PUBLICATIONS

"4th Workshop on Emotions and Personality in Personalized Systems (EMPIRE) 2016", 10th ACM Conference on Recommender Systems (RecSys 2016), (2016), 74 pgs.
"U.S. Appl. No. 15/870,030, Non Final Office Action dated Aug. 30, 2019", 10 pgs.
"U.S. Appl. No. 15/870,030, Notice of Allowance dated Jan. 2, 2020", 5 pgs.
"U.S. Appl. No. 15/870,030, Response filed Dec. 2, 2019 to Non Final Office Action dated Aug. 30, 2019", 12 pgs.

* cited by examiner

AUTOMATED VOICE ASSISTANT PERSONALITY SELECTOR

CROSS-REFERENCE TO RELATED APPLICATION

This application is a continuation of U.S. patent application Ser. No. 15/870,030, filed Jan. 12, 2018, now issued as U.S. Pat. No. 10,643,632, which is incorporated by reference herein in its entirety.

TECHNICAL FIELD

Embodiments described herein generally relate to voice-enabled personal assistants and, in some embodiments, more specifically to automated personality selection for a voice-enabled personal assistant.

BACKGROUND

A voice-enabled virtual assistant may interact with a user using voice prompts to complete various activities. A user may interact with the voice-enabled virtual assistant by using specific commands or natural language phrases. The voice-enabled virtual assistant may respond by outputting audio such as text-to-speech output that may convert text based output to voice. The speech output of the voice-enabled virtual assistant may have characteristics that define its personality such as tone, timbre, sex, accent, etc. People may respond differently to different personality characteristics of a speaking voice.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
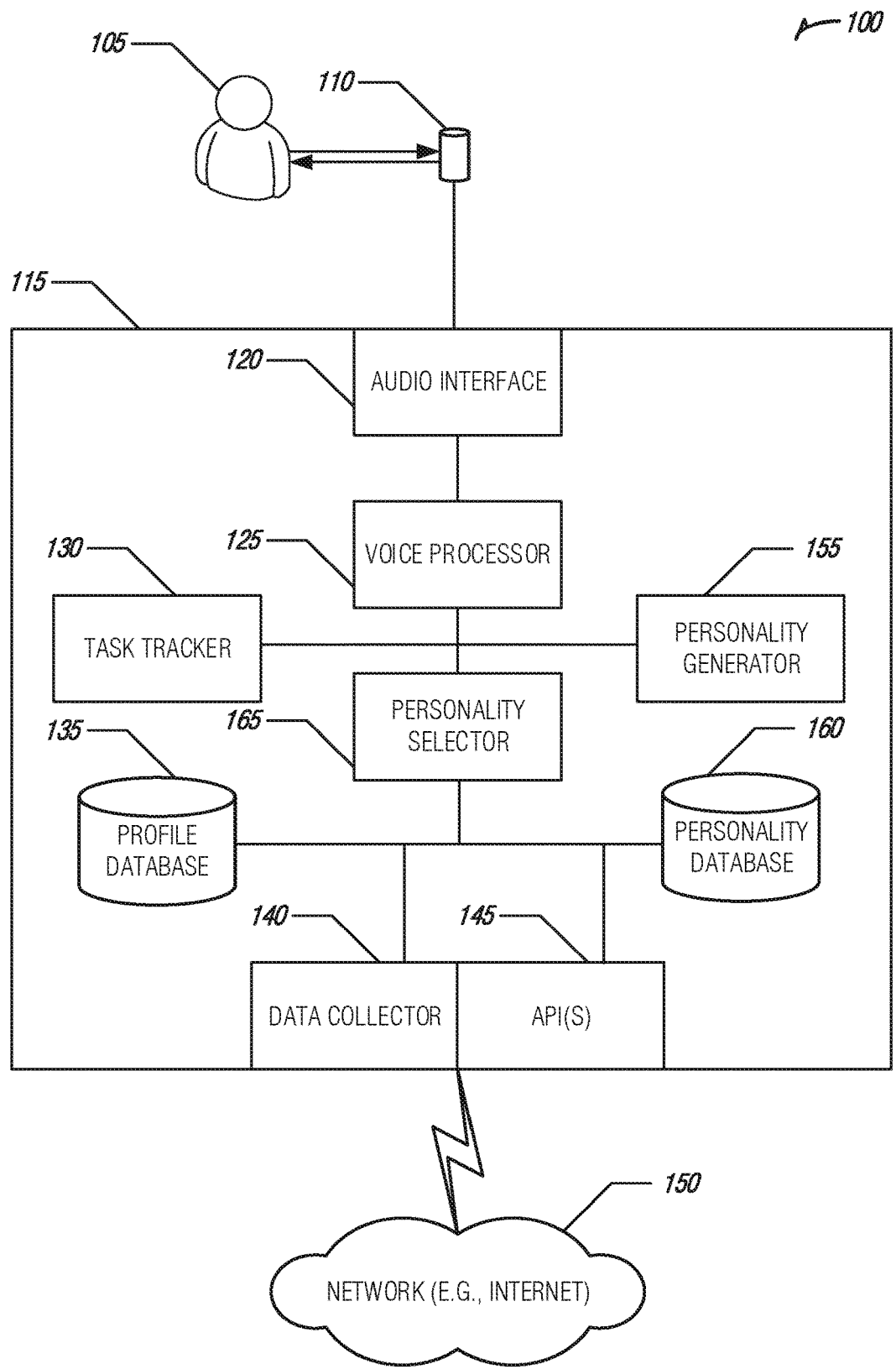
FIG. 1 is a block diagram of an example of an environment and a system for automated voice assistant personality selector, according to an embodiment.

A voice-enabled virtual assistant may be a connected (e.g., internet connected, etc.) or stand-alone device that includes a speaker and microphone that is capable of receiving spoken user input and providing spoken user output. In some instances, the voice-enabled virtual assistant may be a software component that leverages the microphone and speaker of host device (e.g., computer, laptop, smartphone, tablet, etc.) to receive input and deliver output. A voice personality may include audio characteristics of the voice such as pitch, tine, timbre, intensity, etc. The voice characteristics may provide a person hearing the voice with clues about demographic information of the speaker such as sex, ethnicity, age, regionality, etc.

Traditional voice-enabled virtual assistants may output speech using the same voice for everyone within a household. A traditional voice-enabled virtual assistant may show no differentiation between users, may not detect identity, and may not change its personality (e.g., pitch, tone, timbre, accent, etc.) based on the user or the task to be completed. This may be true even if the user has a preference for a different personality. Human beings may respond in different ways to different voices. By providing the voice-enabled virtual assistant with the ability to determine the optimal personality characteristics for a task and a user may help drive the user to complete the task in a shorter amount of time than the user would have if the voice-enabled virtual assistant uses a single personality for all interactions.

The techniques discussed herein may provide the voice-enabled virtual assistant with features that allow for the selection of a voice personality that may be more likely to cause the user to complete a task. The selection may be based on analysis of the outcomes of the task by other users with similar characteristics receiving output by the selected voice personality. A set of personalities may be created based on the customer and customers within a group. Different personalities or characters for the voice-enabled virtual assistant may be selected based on the current user of the system (e.g., identified by voice, etc.) and a task that the customer is expected to perform (e.g., identified based on circumstances of the user, a task designated in a profile of the user, etc.).

In an example, after determining the customer type and their current state, based on social media scanning and personality analysis, the system may create a character with a personality that may appeal to the customer (e.g., a default profile, etc.). The voice-enabled virtual assistant may use this character or personality in communication with the user. The voice-enabled virtual assistant may determine other personalities, or versions of a personality, that may be used to trigger specific behaviors in the user. For example, a female voice may improve empathy and emotional states and a female personality may be selected when empathy or an improved emotional state is expected to prompt the user to complete a task. A male voice may be preferred when the user is receiving guidance or direction. Selection of a voice personality, however, may vary individual to individual and task to task. Therefore, the voice personality or character of the voice-enabled virtual assistant may change based on the task to be performed by the user.

Multiple voice personalities or characters may be stored in the voice-enabled virtual assistant (or other storage device) that may be selected as circumstances dictate by the voice-enabled virtual assistant. For example, there may be a grandmotherly character that may emotionally connect with the user and a serious, more authoritarian, male figure who may provide more forceful guidance. The grandmotherly voice personality may be used for a user that is completing a task such as funeral plans where empathy may prompt the user to action and the serious male voice personality may be used for the user when completing a financial transaction.

As previously noted, some users may respond to voice profiles with certain characteristics for certain tasks. Thus, data may be collected from the user community to determine profile characteristics that may indicate a particular voice personality may have a positive effect on completion of a task by a user with certain characteristics. For example, user with similar income levels and education levels may respond similarly when presented task completion commands by a particular personality having certain voice characteristics.

The voice-enabled virtual assistant may provide many services and some services may rely on character differentiation for effective service delivery. The voice-enabled virtual assistant may act in different ways using different voice personalities depending on the user effect desired. In this way, a user may access a virtual team of assistants that may work together to assist the user in completing a task rather than a single personality in a traditional voice-enabled virtual assistant.

The voice-enabled virtual assistant may determine which of the voice personalities are the most effective for completing a task for a user community with particular profile characteristics. The determination may be based on an evaluation of a profile of the user compiled from their self-reported information and internal (e.g., previous interactions with the voice-enabled virtual assistant, etc.) and external communications (e.g., social networks, email etc.). The voice-enabled virtual assistant may leverage wearables and other internet of things (IoT) devices in order to detect a current user state such as, for example, stress levels. The voice-enabled virtual assistant may then select an appropriate voice personality for to use to deliver appropriate output to complete the task. In an example, the voice-enabled virtual assistant may seamlessly switch between voice personalities and even blend personalities by splitting output between the personalities or outputting a discussion between the personalities.

FIG. 1 is a block diagram of an example of an environment 100 and a system 115 for automated voice assistant personality selector, according to an embodiment. The environment 100 may include a user 105 that may be interacting with a device 110 via voice. The device 110 may include a microphone for collecting the voice of the user 105 as input and may include a speaker for outputting audio such as speech audio generated by a voice-enabled virtual assistant. The device 110 may be communicatively coupled (e.g., via shared bus, wireless network, wired network, cellular data, etc.) to the system 115. The device 110 may be specially configured for a personality selecting voice-enabled virtual assistant or may be a general purpose audio device. The device can be an in-home unit, part of a smartphone, or can be a wearable device. In an example, the system 115 may be a component of the voice-enabled virtual assistant. The user 105 and other user may opt-in to the system 115 by agreeing to allow audio and other data to be collected and evaluated to provide advanced interaction features to the voice-enabled virtual assistant.

The system 115 may include an audio interface 120, a voice processor 125, a task tracker 130, a profile database 135, a data collector 140, application program interface(s) (API(s)) 145, a personality generator 115, a personality database 160, and a personality selector 165. The system 115 may be communicatively coupled to a network 150 (e.g., the internet, wireless network, etc.) that may include data about the user 105 and other users of the system 115.

The audio interface 120 may receive input audio data (e.g., from a microphone of the device 110, etc.) and may generate output audio (e.g., for output from a speaker of device 110, etc.). The audio interface may be coupled to an audio surface that may record and broadcast sound such as the audio components of the device 110. The audio surface may leverage the device 110 and other devices of the user 105 that may include a microphone and speakers.

The audio interface 120 may send the captured sound to the voice processor 125, and may transmit an audio stream based on output to be transmitted to the user 105. The voice processor 125 may capture an incoming voice stream, identify the user 105 based on vocal intonation and other factors, convert the audio stream text, and annotate the text with indications for vocal stress and other detected emotional factors.

The data collector 140 may collect communications and social network activity of the user 105 in order to develop a profile of the user. The data collector 140 may also collect data of other users of the system 115 to be evaluated (e.g., by a machine learning processor, etc.) to determine personality similarities between users of the system 115. The evaluation may include identifying types of data and terminology that may appeal to the users with certain personality attributes. The data collector 140 may collect communications and results of the communications and may use the data to determine personality attributes and interactions that may provide successful outcomes for user tasks.

The personality generator 155 may generate a character or voice personality to be used by the voice-enabled virtual assistant to communicate specifically with the user 105. This personality generator 155 may create a new character from scratch or may generate a specific archetype of an existing character that may appeal to a similar demographic. The character archetypes and generated personalities may be stored in the personality database 160.

The personality database 160 may include character archetypes, a set of "stock characters" that may be used as-is (or with modifications) in order to generate a new character for communications with the user 105. The personality database 160 may be updated as voice personalities are generated and modified as they are refined by usage data and outcomes. Additionally, the characters may be updated as new information on the effectiveness of specific shown character traits is evaluated by the system (e.g., using a machine learning processor, etc.). For example, an off-the-shelf "drill sergeant" voice personality may improve in effectiveness with a specific demographic, ethnographic, or social group, with a slight personality modification for a specific user type. The more effective version of the character may become part of the stock voice personality if the modification is determined to be effective.

The profile database 135 may include user profiles created by the system. The user profiles may include self-reported data such as demographic information and may include activity information collected by the data collector 140. The profile database 135 map include identification of voice personalities that are most effective with specific users and for specific tasks. The profile database 135 may include links to the character archetypes in the personality database 160 and customizations for the user 105.

The API(s) 145 may provide interconnectivity between the system 115 and external data sources such as, for example, social networking sites, email systems, databases, etc. The API(s) 145 may be configured to interface the external systems and may receive instructions from the system to collect external data (e.g., periodically, continuously, on-demand, etc.) for the user 105 and other users of the system 115. The collected data may be added to a user profile included in the profile database 135.

The audio interface 120 may identify a number of users of the device 110 using tone, terminology, speech patterns etc. and may develop individual user profile records in the profile database based on the set of users it has identified. A current user 105 of the device 110 may be manually identified (e.g., the customer attaches vocal profiles to specific social network accounts and email accounts, etc.) or identified through automatic user detection (e.g., geolocation, postal address, voice pattern, etc.). Demographic information may be determined for each user that may be added to the profile of the user. In an example, interactive voice response (IVR) and other biometrics may be used to determine the current user 105.

The task tracker 130 may identify a task to be completed by the user 105 of a voice-enabled virtual assistant (e.g., communicatively coupled to the device 110, etc.). The personality selector 165 may select a voice personality from the personality database 160 based on the identified task and information retrieved from the profile database 135. For example, the task may be identified as making a will and an evaluation of the profile database may indicate that a grandmotherly voice (e.g., elderly female timbre, etc.) personality may be effective for prompting users to complete end-of-life preparation tasks so a grandmotherly voice personality character may be selected from the personality database 160 and applied to the voice-enabled virtual assistant. In other examples, the voice profile for the task may be selected based on user preferences included in the profile database, a standard voice profile for the voice-enabled virtual assistant, etc.

In an example, the personality selector 165 may compare the personality profile of the user 105 to personality profile data of other users who have completed (e.g., from the profile database 135, etc.) the task and may identify another user with personality characteristics similar to the user 105 based on the comparison. The personality selector 165 may select the default personality for task to use with the voice-enabled virtual assistant by identifying a successful personality profile used to output the task to the other user. For example, another user may share demographic information with the user 105 such as age, gender, home address, etc. and that other user may have completed the will creation task based on the voice-enabled virtual assistant using the grandmotherly voice personality so the grandmotherly voice may be selected as the default voice personality. The relationship between a voice personality and task success may be strengthened as additional users with characteristics similar to the user 105 successfully complete the task delivered by selected voice personality.

In an example, the personality selector 165 may select an appropriate character (or a set of characters) that may appeal to a user with demographic information similar to that of the user 105. The personalities selected may depend on the type of communications sought by the user 105. For example, the personality selector 165 may start by selecting two specific character types, for example, a friendly, thoughtful parent, and stricter, authoritarian parent, depending on the kind of advice or guidance (e.g., task to be completed, etc.) that the voice-enabled virtual assistant is to provide. Additional character types may be selected as circumstances (e.g., task completion, requested tasks, personality, etc.) change or the voice personality characters may be revised based on evaluated effectiveness. In an example, multiple character types may follow up with the user 105 on a task. For example, a father-figure voice profile and a mother-figure voice profile may be selected to follow up with the user 105 by checking the status of task items to be completed.

The voice processor 125 may receive a textual description of the task (e.g., the steps to be completed, etc.) and may convert the description to speech. The voice processor 125 may work in conjunction with the audio interface 125 and the device 110 to output a description of the task using a default personality selected for the voice-enabled virtual assistant by the personality selector 165 based on the task (e.g., the grandmotherly voice profile for the will creation task, etc.).

The task tracker 130 may track user 105 task data in a user profile of the user 105 included in the profile database 135. The task data may include task checkpoints and checkpoint attainment data including expected time periods for completion of task checkpoint items. For example, the creating a will task may include checkpoints for identifying assets, identifying beneficiaries, identifying an executor, etc. Each checkpoint may have a corresponding expected time frame (e.g., based on other user completion rates, standard operating procedure, statutory bars, etc.) in which the checkpoint is expected to be attained.

The task tracker 130 may determine a task completion checkpoint for the task to be completed by the user 105 and may identify that the task completion checkpoint has not been reached. In an example, the task tracker 130 may maintain a description of the task that includes metadata indicating task completion checkpoints and associated time periods for checkpoint completion. Identification that the task completion checkpoint has not been reached may include identification that the task completion checkpoint has not been completed by an associated time period for checkpoint completion.

The task tracker 130 may work in conjunction with the personality selector 165 to compare a personality profile of the user 105 to personality data of a set of voice-enabled virtual assistant profiles (e.g., as stored in the profile database 135, etc.) as corresponding to respective members of a set of available voice personalities (e.g., as stored in the personality database 160, etc.) for the voice-enabled virtual assistant. In an example, the personality profile of the user 105 may include demographic information (e.g., gender, age, address, home town, ethnicity, etc.) of the user 105. In another example, the personality profile of the user 105 may include interaction history data (e.g., successful task completions, mood patterns, trigger words, etc.) collected from prior interactions between the voice-enabled virtual assistant and the user 105.

The personality selector 165 may select an escalation personality for the voice-enabled virtual assistant based the comparison and the task. In an example, a group of escalation users may be identified that completed the task upon transmission of commands for facilitating completion of the task via the voice-enabled virtual assistant using the escalation personality. For example, the group of escalation user may include users that did not complete the task after delivery of the task description by the default voice profile, but completed the task after receiving commands from the escalation personality. The personality selector 165 may extract a set of personality features from the group of escalation users and may store the set of personality features in the personality data for the escalation personality (e.g., in the profile database 135, personality database 160, etc.). The escalation personality may be a member of the set of available voice personalities and the comparison of the personality profile of the user 105 to personality data of the set of voice-enabled virtual assistant profiles may use the set of personality features.

The voice processor 125 may work in conjunction with the audio interface 120 to transmit commands for facilitating user 105 completion of the task via the voice-enabled virtual assistant (e.g., via the device 110) using the selected escalation personality. For example, the task tracker 130 may provide commands (e.g., consider members of your family, make a list of those you wish to receive a portion of your assets upon death, etc.) for identifying beneficiaries of a will via text to the voice processor 125 which may convert the text to speech using an authoritarian male voice personality that may be evaluate to be effective in prompting successful completion of the task by other users of the system 115. The speech may be transferred to the audio interface 120 for transmission to the voice-enabled virtual assistant corresponding with the device 110 for output to the user 105. In an example, the escalation personality may be a modified version of the default personality. For example, characteristics such as, for example, tone, timber, etc. may be modified to alter the personality of the default personality.

In an example, the commands for facilitating user completion of the task may be segmented into a first subset and a second subset. For example, the first subset of the commands may be queries and the second subset of commands may be directives. The default personality may be selected for transmission of the first subset to the user 105 via the voice-enabled virtual assistant and the escalation personality may be selected for transmitting the second subset to the user 105 via the voice-enabled virtual assistant. For example, the authoritarian male voice personality may be selected for delivering the directives while the grandmotherly voice personality may be selected for delivering the queries based on evaluation of the effectiveness of the respective voice personalities in prompting completion of task elements by other users. In an example, the user 105 may request addition of a personality to a team of voice personalities to provide assistance that the team may currently be unable to perform.

In another example, a personality interaction routine may be identified for the task based on the task completion checkpoint. The personality interaction routine may include instructions (e.g., a script, etc.) for facilitating a discussion between the voice-enabled virtual assistant using the default personality and the voice-enabled virtual assistant using the escalation personality. The discussion may be output via the voice-enabled virtual assistant by alternating, based on the personality interaction routine, output using the default personality and output using the escalation personality. For example, the personality interaction routine may include the authoritarian male voice personality asking the grandmotherly voice personality about its experience creating a will with the grandmotherly voice personality responding with a story about her virtual experience creating a will and an anecdote about a family of a friend that was affected by a family member not having a will in place upon death. The personality interaction routines may be automatically created using machine learning techniques by evaluating external and internal data such as articles on related topics, interactions between other users and the system 115, etc. or they may be created and stored in the personality database 160 or the profile database 135.

If the selected escalation personality was successful in prompting completion of the task, then that success may be added to training data for the personality selector 165 for future interaction and possible revision of a voice personality or creation of a new voice personality with the new, more effective characteristics. In this way, the personality selector 165 may continuously improve itself and become more effective in selecting. In an example, common behaviors may be identified that may be effective in providing guidance to users of the system 115. The effective behaviors may be captures and stored in the personality database 160. The effective behaviors may then be output to users as best practices for a task by the corresponding voice personality.

In an example, the personality selector 165 may select a new voice personality of may modify a selected voice personality of the voice-enabled virtual assistant during the conversation based on changing task completion checkpoint attainment or other changing circumstances of the interaction.

In an example, after repeated attempts to prompt the user 105 to complete the task, selective restrictions or revisions of services may be triggered in an attempt to prompt task completion by the user 105. For example, after repeated admonishments of an authoritarian voice personality, the user 105 may continue overspending behavior and instructions for severe temporary restrictions on an ability of the user 105 to transact may be transmitted to a transaction server of a financial system, etc.

Figure 2:
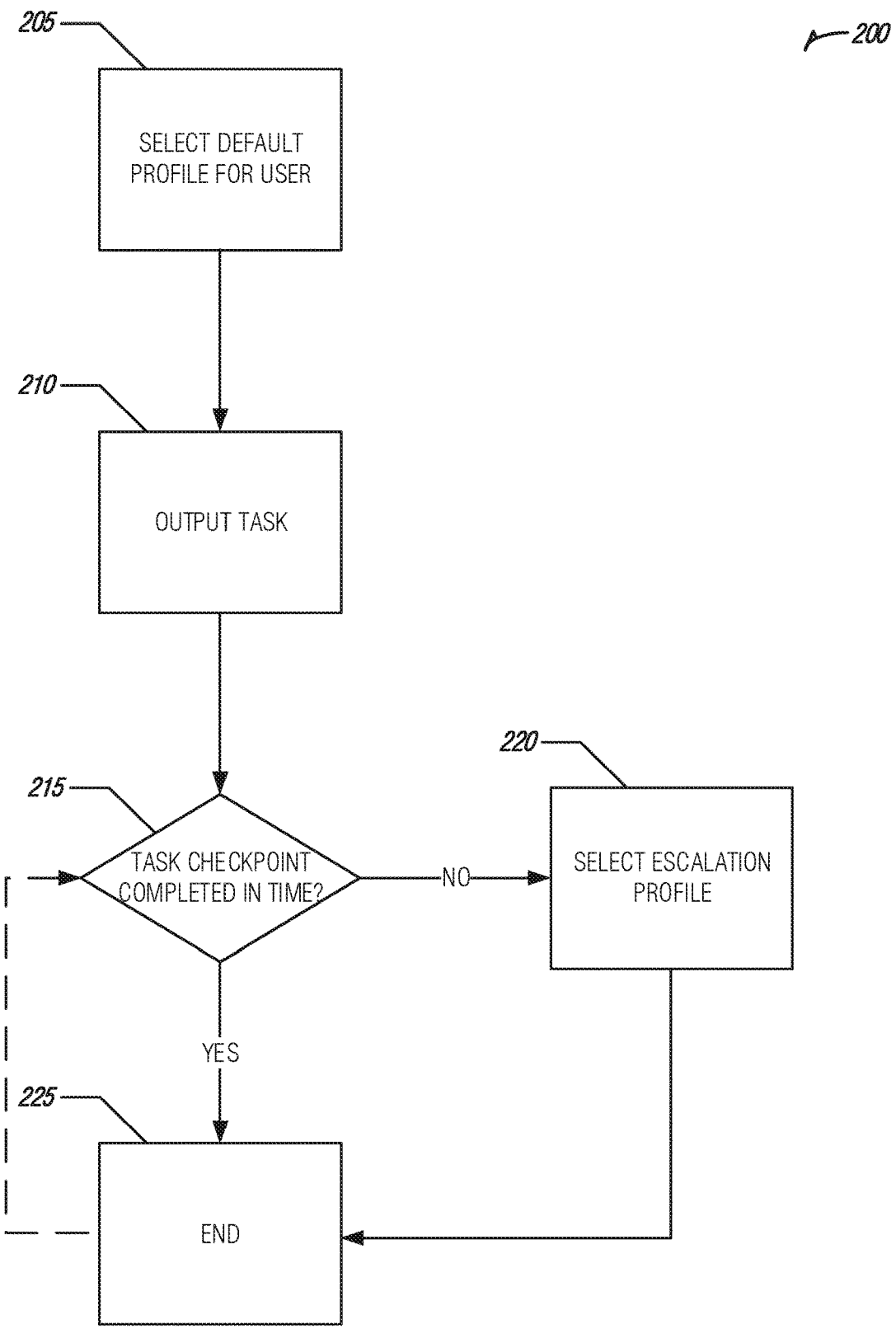
FIG. 2 illustrates a flow diagram of an example of a process for automated voice assistant personality selector, according to an embodiment.

FIG. 2 illustrates a flow diagram of an example of a process 200 for automated voice assistant personality selector, according to an embodiment. The process may provide features as described in FIG. 1.

As the user communicates with the voice-enabled virtual assistant, the voice-enabled virtual assistant may determine the voice personality it should respond with, based on the type of response appropriate to the user (e.g., at operation 205). The type of response may be based on a task to be output to the user by the voice-enabled virtual assistant. For example, if the voice-enabled virtual assistant detects that the user may prefer a more empathetic response, it may use an empathetic voice personality in response. If the voice-enabled virtual assistant detects that a less empathetic response may be more effective, it may then provide that response using a less empathetic voice personality. The task may then be output to the user (e.g., at operation 210).

Depending on the results of the interaction (e.g., at operation 215), the voice-enabled virtual assistant may continue to revise the voice personality (e.g., at operation 220) and respond (e.g., hold a conversation with the user to drive the user to task completion (e.g., at end 225).

Depending on the direction of the conversation and the user's responses (e.g., at decision 215), the system may need to switch voice personality in order to drive to the correct conclusion (e.g., at operation 220).

If the (e.g., at decision 215) was successful in prompting user completion of the task (e.g., at end 225), then that success may be recorded for future interaction and possible revision of an existing voice personality or creation of a new voice personality profile with the new, more effective characteristics. In this way, the voice-enable virtual assistant may continuously improve itself and become more effective.

Figure 3:
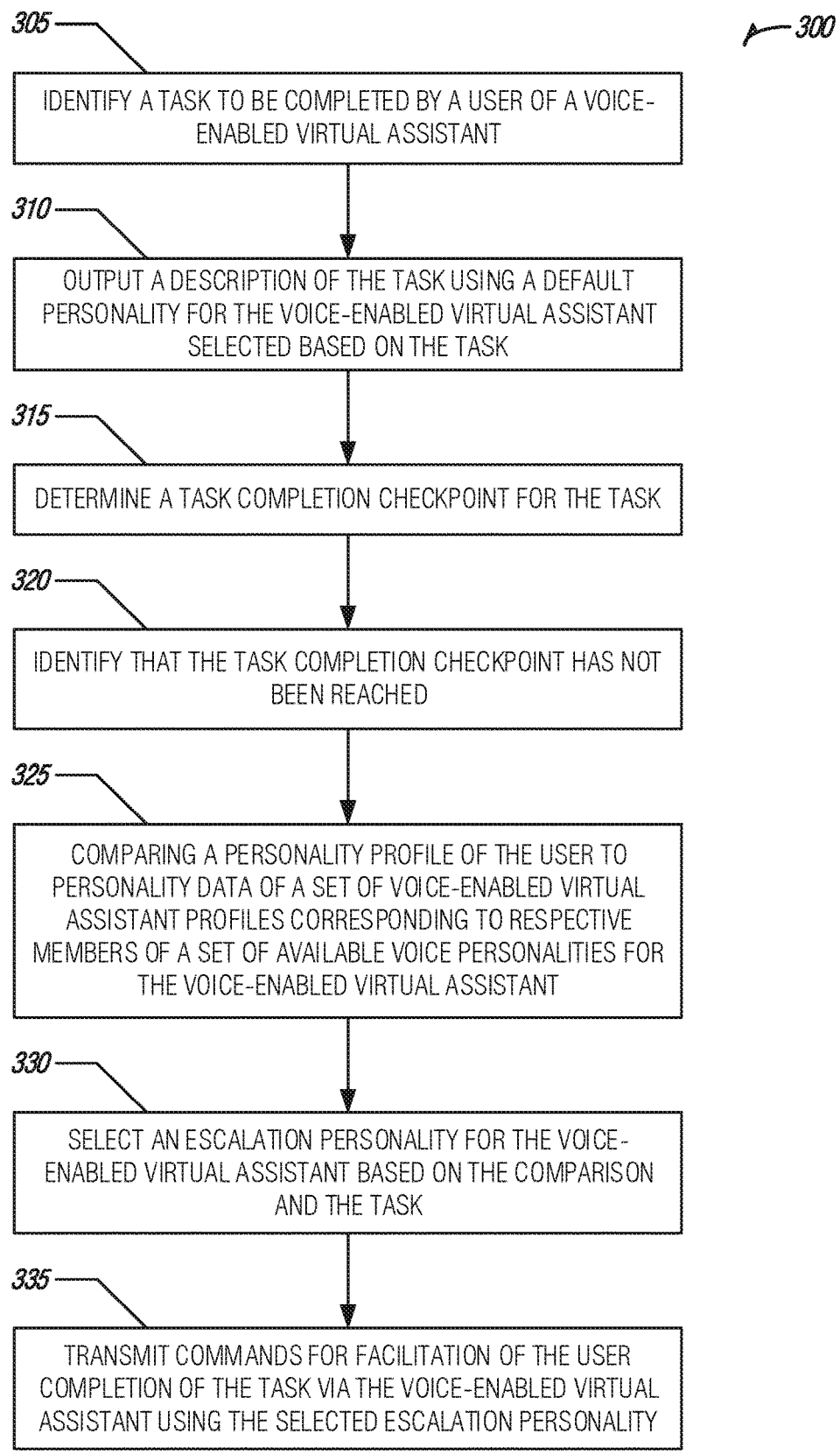
FIG. 3 illustrates an example of a method for automated voice assistant personality selector, according to an embodiment.

FIG. 3 illustrates an example of a method 300 for automated voice assistant personality selector, according to an embodiment. The method 300 may provide feature as described in FIGS. 1 and 2.

A task may be identified (e.g., by the task tracker 130) that is to be completed by a user of a voice-enabled virtual assistant (e.g., at operation 305).

A description of the task may be output (e.g., using the voice processor 125, audio interface 120, and device 110 as described in FIG. 1) using a default personality for the voice-enabled virtual assistant selected (e.g., by the personality selector 165 as described in FIG. 1) based on the task (e.g., at operation 310).

In an example, the personality profile of the user may be compared to personality profile data of other users who have completed the task and another user may be identified with personality characteristics similar to the user based on the comparison. Selecting the default personality for the voice-enabled virtual assistant based on the task may include identification of a successful personality profile used to output the task to the other user.

A task completion checkpoint may be determined (e.g., by the task tracker 130 as described in FIG. 1) for the task (e.g., at operation 315). It may be identified (e.g., by the task tracker 130) that the task completion checkpoint has not been reached (e.g., at operation 320).

In an example, a description of the task may include metadata indicating task completion checkpoints and associated time periods for checkpoint completion and identification that the task completion checkpoint has not been reached may include identification that the task completion checkpoint has not been completed by an associated time period for checkpoint completion.

A personality profile of the user may be compared (e.g., by the personality selector 165 as described in FIG. 1) to personality data of a set of voice-enabled virtual assistant profiles corresponding to respective members of a set of available voice personalities for the voice-enabled virtual assistant (e.g., at operation 325). In an example, the personality profile of the user may include demographic information of the user. In another example, the personality profile of the user may include interaction history data collected from prior interactions between the voice-enabled virtual assistant and the user.

An escalation personality may be selected (e.g., by the personality selector 165 as described in FIG. 1) for the voice-enabled virtual assistant based the comparison and the task (e.g., at operation 330). In an example, a group of escalation users may be identified that completed the task upon transmission of commands for facilitating completion of the task via the voice-enabled virtual assistant using the escalation personality. A set of personality features may be extracted from the group of escalation users and stored in the personality data for the escalation personality. Comparison of the personality profile of the user to the personality data of the set of voice-enabled virtual assistant profiles may use the set of personality features.

Commands for facilitating user completion of the task may be transmitted (e.g., using the voice processor 125 and audio interface 120) via the voice-enabled virtual assistant using the selected escalation personality (e.g., at operation 335). In an example, the commands for facilitating user completion of the task may be segmented into a first subset and a second subset and the default personality may be selected for the transmitting the first subset to the user via the voice-enabled virtual assistant and the escalation personality may be selected for the transmitting the second subset to the user via the voice-enabled virtual assistant.

In an example, a personality interaction routine may be identified for the task based on the task completion checkpoint. The personality interaction routine may include instructions for facilitating a discussion between the voice-enabled virtual assistant using the default personality and the voice-enabled virtual assistant using the escalation personality. The discussion may be output via the voice-enable virtual assistant by alternating, based on the personality interaction routine, output using the default personality and output using the escalation personality.

Figure 4:
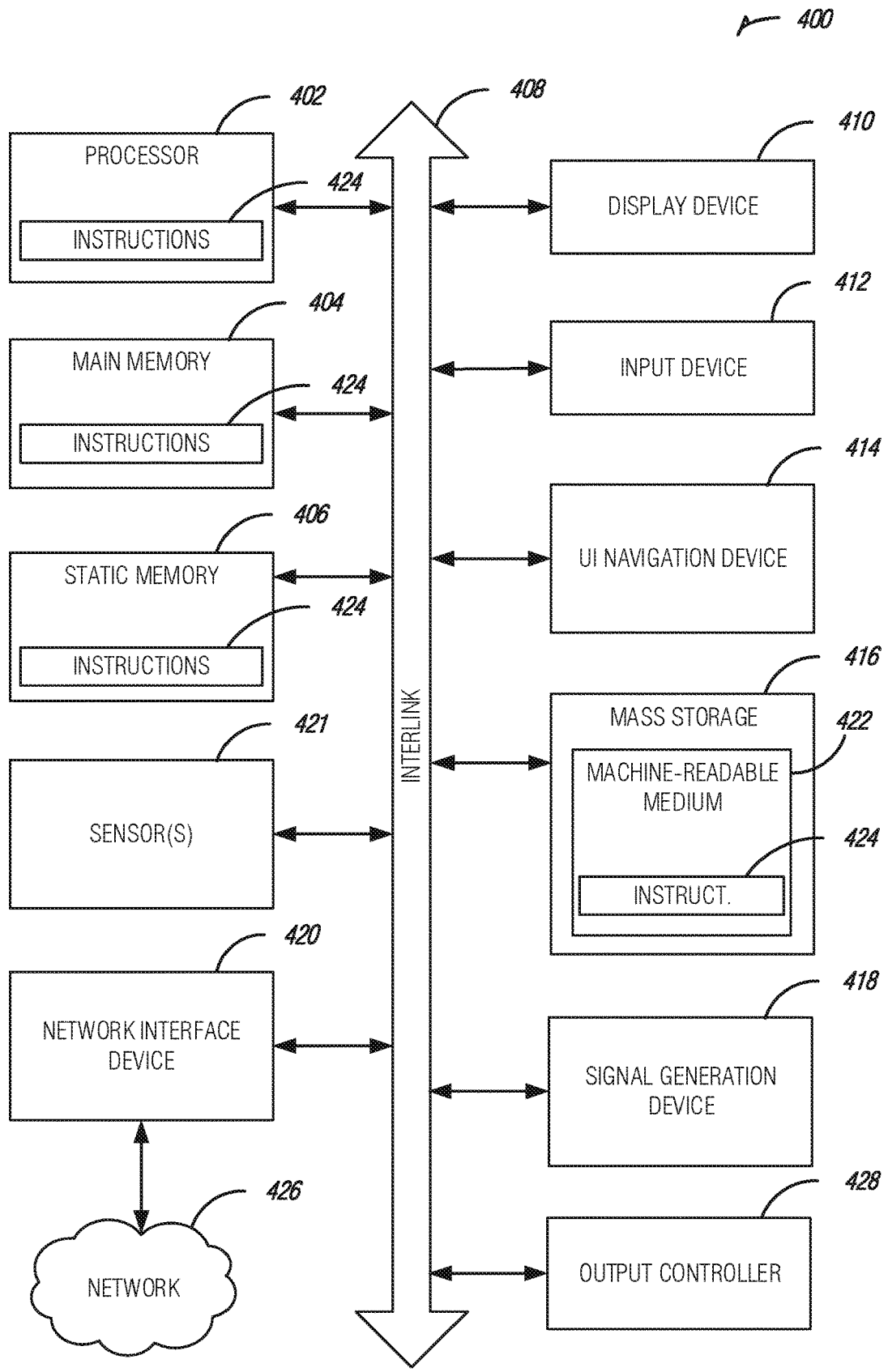
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for virtual assistant personality escalation, the system comprising:

at least one processor; and memory including instructions that, when executed by the at least one processor, cause the at least one processor to perform operations to:

identify, by a voice-enabled virtual assistant, a task to be completed by a user of the voice-enabled virtual assistant;

generate a virtual assistant personality team to interact with the user to complete the task based on a comparison a personality profile of the user to personality data of a set of voice-enabled virtual assistant profiles for the voice-enabled virtual assistant, wherein the virtual assistant personality team includes a default personality selected from the set of voice-enabled virtual assistant profiles and an escalation personality selected from the set of voice-enabled virtual assistant profiles;

output, by the voice-enabled virtual assistant, a response in connection with the task using the default personality for the voice-enabled virtual assistant selected based on the task via a device communicatively connected to the voice-enabled virtual assistant;

identify that a task completion checkpoint for the task has not been reached;

transmit commands to facilitate user completion of the task via the voice-enabled virtual assistant using the escalation personality, wherein the escalation personality provides the commands using a different output profile than the default personality, wherein the different output profile includes different vocal characteristics from an output profile of the default personality.

2. The system of claim 1, further comprising instructions to:

compare the personality profile of the user to personality profile data of other users who have completed the task;

identify another user with personality characteristics similar to the user based on the comparison, wherein the instructions to select the default personality for the voice-enabled virtual assistant based on the task include instructions to identify a successful personality profile used to output the task to the other user.

3. The system of claim 1, wherein a description of the task includes metadata indicating task completion checkpoints and associated time periods for checkpoint completion and identifying that the task completion checkpoint has not been reached includes identifying that the task completion checkpoint has not been completed by an associated time period for checkpoint completion.

4. The system of claim 1, further comprising instructions to:

identify a group of users that completed the task upon transmission of commands to facilitate completion of the task via the voice-enabled virtual assistant using the escalation personality;

extract a set of personality features from the group of users; and store the set of personality features in the personality data for the escalation personality, wherein the escalation personality is a member of the set of voice-enabled virtual assistant profiles, and wherein the instructions to compare the personality profile of the user to the personality data of the set of voice-enabled virtual assistant profiles includes instructions to use the set of personality features.

5. The system of claim 1, wherein the personality profile of the user includes demographic information of the user.

6. The system of claim 1, wherein the personality profile of the user includes interaction history data collected from prior interactions between the voice-enabled virtual assistant and the user.

7. The system of claim 1, further comprising instructions to:

segment the commands for facilitating user completion of the task into a first subset and a second subset;

transmit the first subset to the user via the voice-enabled virtual assistant using the default personality; and transmit the second subset to the user via the voice-enabled virtual assistant using the escalation personality.

8. The system of claim 1, further comprising instructions to:

identify a personality interaction routine for the task based on the task completion checkpoint, wherein the personality interaction routine includes instructions for facilitation of a discussion between the voice-enabled virtual assistant using the default personality and the voice-enabled virtual assistant using the escalation personality; and output, via the voice-enabled virtual assistant, the discussion by alternation based on the personality interaction routine of the output using the default personality and the output using the escalation personality.

9. At least one machine readable medium including instructions for virtual assistant personality escalation that, when executed by at least one processor, cause the at least one processor to perform operations to:

identify, by a voice-enabled virtual assistant, a task to be completed by a user of the voice-enabled virtual assistant;

generate a virtual assistant personality team to interact with the user to complete the task based on a comparison a personality profile of the user to personality data of a set of voice-enabled virtual assistant profiles for the voice-enabled virtual assistant, wherein the virtual assistant personality team includes a default personality selected from the set of voice-enabled virtual assistant profiles and an escalation personality selected from the set of voice-enabled virtual assistant profiles;

output, by the voice-enabled virtual assistant, a response in connection with the task using the default personality for the voice-enabled virtual assistant selected based on the task via a device communicatively connected to the voice-enabled virtual assistant;

identify that a task completion checkpoint for the task has not been reached;

transmit commands to facilitate user completion of the task via the voice-enabled virtual assistant using the escalation personality, wherein the escalation personality provides the commands using a different output profile than the default personality, wherein the different output profile includes different vocal characteristics from an output profile of the default personality.

10. The at least one machine readable medium of claim 9, further comprising instructions to:

compare the personality profile of the user to personality profile data of other users who have completed the task;

identify another user with personality characteristics similar to the user based on the comparison, wherein the instructions to select the default personality for the voice-enabled virtual assistant based on the task include instructions to identify a successful personality profile used to output the task to the other user.

11. The at least one machine readable medium of claim 9, wherein a description of the task includes metadata indicating task completion checkpoints and associated time periods for checkpoint completion and identifying that the task completion checkpoint has not been reached includes identifying that the task completion checkpoint has not been completed by an associated time period for checkpoint completion.

12. The at least one machine readable medium of claim 9, further comprising instructions to:
   identify a group of users that completed the task upon transmission of commands to facilitate completion of the task via the voice-enabled virtual assistant using the escalation personality;
   extract a set of personality features from the group of users; and
   store the set of personality features in the personality data for the escalation personality, wherein the escalation personality is a member of the set of voice-enabled virtual assistant profiles, and wherein the instructions to compare the personality profile of the user to the personality data of the set of voice-enabled virtual assistant profiles includes instructions to use the set of personality features.

13. The at least one machine readable medium of claim 9, wherein the personality profile of the user includes demographic information of the user.

14. The at least one machine readable medium of claim 9, wherein the personality profile of the user includes interaction history data collected from prior interactions between the voice-enabled virtual assistant and the user.

15. A method for virtual assistant personality escalation, the method comprising:
   identifying, by a voice-enabled virtual assistant, a task to be completed by a user of the voice-enabled virtual assistant;
   generating a virtual assistant personality team to interact with the user to complete the task based on a comparison a personality profile of the user to personality data of a set of voice-enabled virtual assistant profiles for the voice-enabled virtual assistant, wherein the virtual assistant personality team includes a default personality selected from the set of voice-enabled virtual assistant profiles and an escalation personality selected from the set of voice-enabled virtual assistant profiles;
   outputting, by the voice-enabled virtual assistant, a response in connection with the task using the default personality for the voice-enabled virtual assistant selected based on the task via a device communicatively connected to the voice-enabled virtual assistant;
   identifying that a task completion checkpoint for the task has not been reached;
   transmitting commands to facilitate user completion of the task via the voice-enabled virtual assistant using the escalation personality, wherein the escalation personality provides the commands using a different output profile than the default personality, wherein the different output profile includes different vocal characteristics from an output profile of the default personality.

16. The method of claim 15, further comprising:
   comparing the personality profile of the user to personality profile data of other users who have completed the task;
   identifying another user with personality characteristics similar to the user based on the comparison, wherein selecting the default personality for the voice-enabled virtual assistant based on the task includes identifying a successful personality profile used to output the task to the other user.

17. The method of claim 15, wherein a description of the task includes metadata indicating task completion checkpoints and associated time periods for checkpoint completion and identifying that the task completion checkpoint has not been reached includes identifying that the task completion checkpoint has not been completed by an associated time period for checkpoint completion.

18. The method of claim 15, further comprising:
   identifying a group of users that completed the task upon transmission of commands for facilitating completion of the task via the voice-enabled virtual assistant using the escalation personality;
   extracting a set of personality features from the group of users; and
   storing the set of personality features in the personality data for the escalation personality, wherein the escalation personality is a member of the set of voice-enabled virtual assistant profiles, and wherein comparing the personality profile of the user to the personality data of the set of voice-enabled virtual assistant profiles uses the set of personality features.

19. The method of claim 15, wherein the personality profile of the user includes demographic information of the user.

20. The method of claim 15, wherein the personality profile of the user includes interaction history data collected from prior interactions between the voice-enabled virtual assistant and the user.

* * * * *